(12) United States Patent
Mallett

(10) Patent No.: US 8,482,573 B2
(45) Date of Patent: Jul. 9, 2013

(54) APPARATUS AND METHOD FOR PROCESSING DATA

(75) Inventor: Richard P. D. Mallett, Faversham (GB)

(73) Assignee: TV One Ltd., Margate (GB)

( * ) Notice: Subject to any disclaimer, the term of this patent is extended or adjusted under 35 U.S.C. 154(b) by 848 days.

(21) Appl. No.: 12/604,700

(22) Filed: Oct. 23, 2009

(65) Prior Publication Data

US 2010/0328329 A1    Dec. 30, 2010

(30) Foreign Application Priority Data

Jun. 25, 2009  (GB) .................................. 0911045.3

(51) Int. Cl.
*G09G 5/39* (2006.01)

(52) U.S. Cl.
USPC ........................................................ 345/531

(58) Field of Classification Search
None
See application file for complete search history.

(56) References Cited

U.S. PATENT DOCUMENTS

| | | | |
|---|---|---|---|
| 5,548,709 A | 8/1996 | Hannah et al. | |
| 5,995,677 A | 11/1999 | Jones | |
| 6,313,846 B1 * | 11/2001 | Fenney et al. | 345/552 |
| 6,577,776 B1 * | 6/2003 | Hatalsky | 382/276 |
| 6,717,577 B1 | 4/2004 | Cheng et al. | |
| 7,365,751 B2 | 4/2008 | Shigenaga | |
| 2002/0048410 A1 | 4/2002 | So et al. | |
| 2004/0056874 A1 | 3/2004 | MacInnis et al. | |
| 2004/0135784 A1 | 7/2004 | Cohen et al. | |
| 2006/0164429 A1 | 7/2006 | Mantor et al. | |

OTHER PUBLICATIONS

Trajkovic et al. "Improving SDRAM Access Energy Efficiency for Low-Power Embedded Systems", ACM Transactions on Embedded Computing Systems, vol. 7, No. 3, Article 24, Publication date Apr. 2008.*

* cited by examiner

*Primary Examiner* — Tize Ma
*Assistant Examiner* — Yingchun He

(57) ABSTRACT

Incoming video data is processed. According to an example embodiment, video data as presented in rows of pixels is stored in terms of blocks of pixels of corresponding images making up the video. When a particular pixel is read from memory, the block of pixels is retrieved (e.g., with a single read), facilitating (simultaneous) access to pixels in adjacent rows or columns, without necessarily accessing entire rows and columns to do so.

21 Claims, 9 Drawing Sheets

$$\begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix}$$

$$[a_{00} \quad a_{01} \quad a_{02} \quad a_{03}]$$

$$[a_{10} \quad a_{11} \quad a_{12} \quad a_{13}]$$

$$[a_{20} \quad a_{21} \quad a_{22} \quad a_{23}]$$

$$[a_{30} \quad a_{31} \quad a_{32} \quad a_{33}]$$

Fig. 6 Prior Art $$\begin{bmatrix} a_{00} & a_{01} \\ a_{10} & a_{11} \end{bmatrix} \begin{bmatrix} a_{02} & a_{03} \\ a_{12} & a_{13} \end{bmatrix}$$
$$\begin{bmatrix} a_{20} & a_{21} \\ a_{30} & a_{31} \end{bmatrix} \begin{bmatrix} a_{22} & a_{23} \\ a_{32} & a_{33} \end{bmatrix}$$

Fig. 7

$$\begin{bmatrix} a_{30} & a_{20} & a_{10} & a_{00} \\ a_{31} & a_{21} & a_{11} & a_{01} \\ a_{32} & a_{22} & a_{12} & a_{02} \\ a_{33} & a_{23} & a_{13} & a_{03} \end{bmatrix}$$

Fig. 8

APPARATUS AND METHOD FOR PROCESSING DATA

RELATED PATENT DOCUMENTS

This patent document claims the benefit, under 35 U.S.C. §119(a), of United Kingdom Patent Application No. GB 0911045.3, filed on Jun. 25, 2009 and entitled "Apparatus and Method for Processing Data," which is fully incorporated herein by reference.

FIELD

The present invention is directed to an apparatus and a method for processing data.

BACKGROUND

Videos that are processed by computers can be thought of as a sequence of individual still images. Each image is formed of a number of pixels, which are typically arranged in a rectangular array or matrix. The coordinate of any given pixel in the image can be determined by identifying on which horizontal line (or row) and on which vertical line (or column) within the image it is located.

Most video scaler architectures store an incoming video signal into memory in the order in which the individual pixels making up that image arrive. Thus, the whole of the uppermost row of the first image making up the video is stored, moving from the leftmost pixel to the rightmost pixel of that row. These pixels are then stored in a memory as one unit. This is repeated for the second row and so on until a10 of the pixels making up the image have been stored. This is repeated for all images making up the video.

Synchronous Dynamic Random Access Memory (SDRAM) chips are particularly suited to storing video data in this way. In SDRAM, data is stored in banks, rows and columns. One way of visualizing the arrangement of SDRAM chips is to imagine that each bank in the SDRAM memory is a large filing cabinet having a large number of rows and columns of drawers. Each drawer stores a certain amount of information and can be identified by specifying in which particular row and column of a particular filing cabinet it is located.

To avoid confusion between the rows and columns that are used as addresses into the SDRAM and those making up the images, the latter will be referred to as "horizontal lines" and "vertical lines" respectively.

In one implementation, each pixel contains twenty-four bits of information. This means that each pixel can represent one of $2^{24}=16,777,216$ color values. A 48-bit wide data bus can store 48 bits, which equates to two pixels' worth of information since each pixel is twenty-four bits long. This two-pixel piece of information is often referred to as a "data word". Double Data Rate Synchronous Dynamic Random Access Memory (DDR2 SDRAM) chips transfer two data words per clock cycle. This means that each clock cycle can store four pixels' worth of information. Thus, it takes four clock cycles to store sixteen pixels, which equates to eight data words.

FIG. 1 is a timing diagram taken from the Micron 256 Mb DDR2 datasheet, which is available from Micron Technology Inc. whose headquarters is at 8000 South, Federal Way, P.O. Box 6, Boise, ID. 83707-006, USA or via their website at http://download.micron.com/pdf/datasheets/dram/ddr2/256MbDDR2.pdf.

FIG. 1 shows sequential column access in typical DDR2 SDRAM. Sequential column access means accessing any column in a particular row in the SDRAM memory. At time T0, a READ command is issued to read column n from a particular row in a particular bank in the SDRAM memory. At a later time, T2, a further READ command is issued to read a different column b of the same bank and row. At time T3 all of the data contained in column n is returned. As can be seen in FIG. 1, there is a delay of three clock cycles, between T0 and T3, before data is returned from column n. Each of these READ commands to SDRAM results in four "data words" or "DQs" being retrieved from the relevant column of the SDRAM in two clock cycles. Thus, two clocks of data transfer retrieve four DQs, which equates to eight pixels of image data.

The second READ command is issued at T2 before the first four DQs are actually retrieved. This is referred to as "pipelining" and ensures that there are no gaps in the stream of data being accessed from one row, even if the READ commands are not issued continuously.

From time T3 onwards, two data words can be retrieved each clock cycle. This means that it takes one clock cycle to read two data words from different columns of the same row once that row is open.

FIG. 2 is a timing diagram taken from the same Micron 256 Micron 256 Mb DDR2 datasheet. FIG. 2 shows sequential row access in typical DDR2 SDRAM. FIG. 2 is different from FIG. 1 in that, instead of sequentially accessing different columns in the same row, different rows are being accessed sequentially. Sequential row access is required, for example, by 90° rotation.

A first row to be accessed, here row A, is activated by issuing an ACT ("ACTivate") command at time T1. Then, the required column, column n, from row A is read by issuing a READ command at time T4. If it is desired to read data from a different row, whether or not is it also from the corresponding column, row A must first be "pre-charged" or closed. A PRE command is issued at time T6 and, after three clock cycles ($t_{RP}$), row A is closed and another ACT command can be issued at time T9.

In contrast to sequentially reading sequential columns of one row, it takes eight clock cycles to read sequentially from different rows, since each row must be opened and closed before the next row can be read. In summary, it is eight times slower to read sequential rows as it is to read sequential columns in the same row.

In some data processing arrangements, particularly image processing arrangements, frequent sequential row access is required to process the data, which leads to long data processing times and intensive use of system resources. Random row access is required for image warping, whereby an input image is mapped into non-rectangular shapes. These and other characteristics of video-based data access have presented challenges to the processing and use of video data.

SUMMARY

The present invention is exemplified in a number of implementations and applications, some of which are summarized below.

Various embodiments of the present invention address problems including those as discussed above, as well as others including those that are particularly suited to processing video or image data. In various embodiments, the present invention addresses processing overload of data when sequential access to rows is required.

In connection with an example embodiment, an apparatus for processing data includes a receiver circuit, a memory controller circuit, and a populator circuit. The receiver circuit receives data in the form of an array of data elements, the data elements being arranged in horizontal and vertical lines. The memory controller circuit stores (e.g., by controlling a memory), in a memory location, a sub-unit of the array that includes a subset of data elements from each line of neighboring horizontal and vertical lines of the array. The populator circuit retrieves the sub-unit from the memory location for processing. These respective circuits may be implemented, for example, as a computer programmed to carry out the indicated functions, to which application the following examples may be implemented as well.

In connection with another example embodiment, an apparatus for processing video data includes a receiver circuit, a plurality of line buffer circuits, a memory controller circuit, and a populator circuit. The receiver circuit receives video data in the form of an array of pixels arranged in horizontal and vertical lines, the array of pixels representing an image. The line buffer circuits respectively hold a different line of pixels of the received array. The memory controller circuit stores, in a single memory location, a sub-block of the array that includes a subset of pixels from at least two of the line buffers, each subset of pixels including less than all of the pixels from each line, each block of pixels representing a sub-portion of the image. The populator circuit retrieves the sub-block from the memory location for processing.

Another example embodiment is directed to a method for implementation by a programmable computer that executes instructions to cause the programmable computer to perform the following steps: receiving data in the form of an array of data elements, the data elements being arranged in horizontal and vertical lines; storing, in a memory location, a sub-unit of the array that includes a subset of data elements from each line of neighboring horizontal and vertical lines of the array; and retrieving the sub-unit from the memory location for processing.

According to another example aspect of the invention, an apparatus for processing data comprises a receiver arranged to receive data in the form of an array of data elements, the data elements being arranged in horizontal and vertical lines; a memory controller arranged to store in a memory location a sub-unit of the array comprising data elements from neighboring horizontal and vertical lines of the array; and a populator arranged to retrieve the sub-unit from the memory location for processing.

The apparatus allows an efficient usage of processing power by dividing up the array into sub-units comprising data elements from neighboring horizontal and vertical lines of the array, rather than all being from just one horizontal line. This can be particularly applicable to situations in which mappings or transformations of the data are required.

The apparatus may comprise a downscaler arranged to reduce the number of data elements in the array received by the receiver. The downscaler can be used to reduce the overhead on the overall processing requirements for the data, for example if some of the data elements need not actually be processed.

The apparatus may comprise a plurality of line buffers each arranged to hold a different horizontal line of data elements of the array.

The apparatus may comprise a storage controller arranged to cause the memory controller to store data elements from the different horizontal lines of data elements from two or more of the line buffers as the sub-unit in the same memory location as each other.

The apparatus may comprise an output coordinate generator arranged to generate output coordinates. The output coordinate generator may be a Sync Pulse Generator.

The apparatus may comprise a mapper arranged to convert the output coordinates into original data coordinates of required data elements, the required data elements being the data elements stored in memory that contribute information to the corresponding output coordinates. The mapper may be arranged to use a look-up table for the conversion. A look-up table can be particularly useful when it is difficult or impossible to define a mathematical transformation for the conversion. Alternatively, the mapper may be arranged to use a mathematical transformation for the conversion.

The apparatus may comprise a converter arranged to receive original data coordinates of required data elements and determine the memory locations of the sub-units of data elements stored in the memory that contain the required data elements The apparatus may comprise a cache arranged to cache memory locations of recently requested sub-units.

The apparatus may comprise a shift register arranged to store the original data coordinates of required data elements with a corresponding data value.

The apparatus may comprise a populator arranged to fill in the data values using data elements sub-units retrieved from the memory by matching the original data coordinates held in the shift register with the original data coordinates in the retrieved sub-unit.

The apparatus may comprise a plurality of shift registers and an interpolator, whereby, when the original data coordinate is a non-integer value coordinate, the populator is arranged to retrieve data values of neighboring data elements having integer value original data coordinates and the interpolator is arranged to provide an output comprising weighted contributions from each of the retrieved data values of the integer original data coordinates. This provides for complex mappings or warpings of data, for example where non-integer value coordinates are likely.

Instead of the output coordinate generator comprising a Sync Pulse Generator, it may comprise a memory-side output data coordinate generator arranged to generate a set of output data coordinates at a memory frequency and a display-side output coordinate generator arranged to generate output display coordinates at a display frequency.

The apparatus may comprise an offset arrangement arranged to receive the output data coordinates from the memory-side output data coordinate generator and produce an additional set of output data coordinates corresponding to another line of output data coordinates The apparatus may comprise a mapper arranged to receive the set and additional set of output data coordinates and translate them into original data coordinates.

The apparatus may comprise a converter arranged to receive the original data coordinates and convert them into an address into the memory, the address indicating the memory location at which the sub-unit or units containing the data elements at the original data coordinates are located. The address may comprise the bank, row and column in memory in which the sub-unit is located and an offset value which indicates the particular data element in that sub-unit which is required.

The apparatus may comprise an ID generator arranged to generate an internal ID value using the address. The internal ID value may comprise the lower bits of each of the bank, row and column addresses. This can result in a small-sized ID value which is uniquely valid for a significant number of data elements.

The apparatus may comprise a cache arranged to store recently requested sub-units.

The apparatus may comprise a delayer arranged to hold the original coordinates.

The apparatus may comprise a look-up engine arranged to look into the cache using the ID value and retrieve the relevant sub-unit of data elements having the same ID value and fill in data entries for corresponding original data coordinates in line buffers.

The apparatus may comprise a plurality of line buffers, wherein the output coordinates generated by the memory-side output coordinate generator are written to some of the line buffers and corresponding data values can be read from others of the line buffers.

The apparatus may comprise a video scaler.

The apparatus may comprise a memory, the memory containing the memory location. The memory location may comprise a location in SDRAM. SDRAM can be slightly cheaper than other forms of memory, such as SRAM, decreasing the overall costs of the apparatus. The SDRAM may comprise DDR2 SDRAM.

The data to be processed may comprise video data, the array of data elements may comprise an image and the data element may comprise pixels of the image. The apparatus is particularly suited to processing video data.

According to another aspect of the invention, there is provided a method for processing data, comprising receiving data in the form of an array of data elements, the data elements being arranged in horizontal and vertical lines; storing in a memory location a sub-unit of the array comprising data elements from neighboring horizontal and vertical lines of the array; and retrieving the sub-unit from the memory location for processing.

Various method steps are set out in the claims of the above-referenced United Kingdom patent document, to which priority is claimed and which is fully incorporated herein by reference.

In particular, if the memory is an SDRAM memory, the method may comprise storing the sub-array in a memory location in one bank of the SDRAM memory and storing a neighboring sub-unit of the array in a different bank in the SDRAM memory. This can be used to interleave banks in SDRAM, which can reduce processing requirements for the data.

According to another aspect of the invention, there is provided a computer program comprising instructions, which, when executed, cause an apparatus for processing data to execute the method for processing data. A computer-readable medium may comprise the computer program. A signal may comprise the computer program.

The above summary is not intended to describe each illustrated embodiment or every implementation of the present invention

BRIEF DESCRIPTION OF THE DRAWINGS

The invention may be more completely understood in consideration of the detailed description of various embodiments of the invention in connection with the accompanying drawings, in which:

FIG. 6 is a representation of a line-based stored input array, in accordance with one or more example embodiments of the present invention;

FIG. 7 is a representation of a block-based stored input array, in accordance with one or more example embodiments of the present invention;

FIG. 8 is a representation of a 90°-clockwise-rotated output array corresponding to the input array shown in FIG. 5, in accordance with one or more example embodiments of the present invention;

Figure 1:
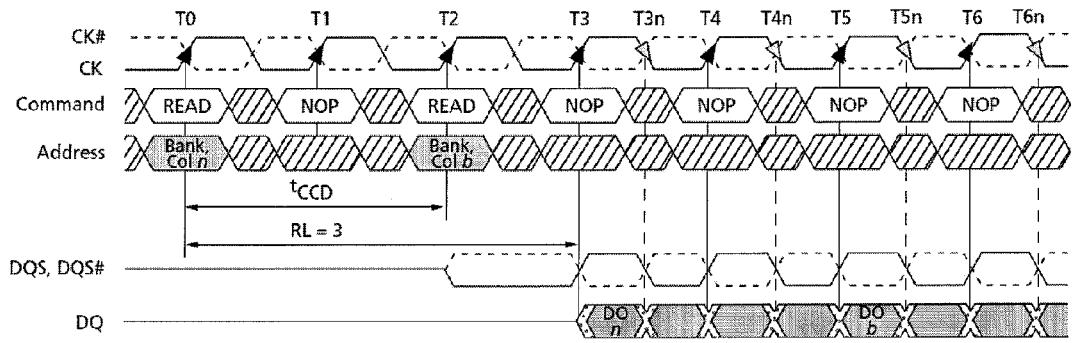
FIG. 1 is a timing diagram of sequential column access in DDR2 SDRAM, to which aspects of various example embodiments may be applied in accessing a sub-array including data elements in adjacent columns.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention, including that defined by the appended claims.

DETAILED DESCRIPTION

The present invention is believed to be applicable to a variety of different types of data processing devices, arrangements and approaches, and has been found to be particularly useful for applications involving the processing of data, such as video data. While the present invention is not necessarily limited to such approaches, various aspects of the invention may be appreciated through a discussion of various examples using these and other contexts.

In connection with various example embodiments, the term "sub-unit" is used herein to mean any group of adjacent data elements that are located in neighboring horizontal and vertical lines (e.g., as may be relative to all being located in the same horizontal or vertical line). For example, the sub-unit may conveniently be a rectangular array, or a simple L-shape, but other-shaped sub-units are within the scope of the term. The sub-unit may comprise a block of data elements. A block provides a convenient shape for the sub-unit, which allows near random access to data elements in all directions. In connection with various example embodiments, accessing such sub-units may thus involve accessing, at once, data elements in adjacent horizontal and vertical lines, which elements would (absent the sub-unit grouping) not be accessible together via horizontal-line access or vertical-line access.

In various embodiments, the sub-unit includes a four-by-four array of data elements from neighboring vertical and horizontal lines of the array. This enables sixteen data elements to be processed in a particularly efficient manner.

Figure 3:
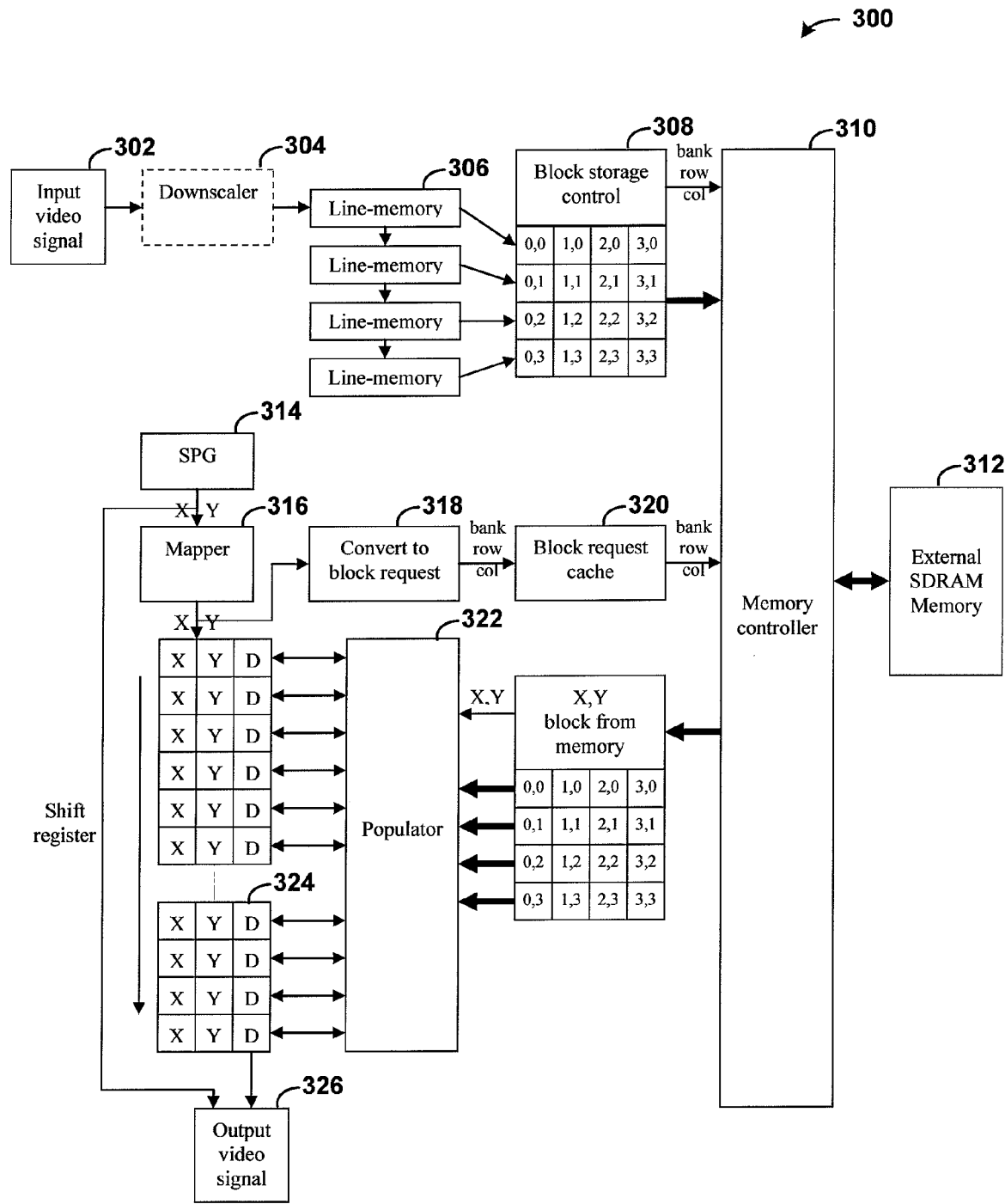
FIG. 3 is a schematic view of a first data processing arrangement, in accordance with one or more example embodiments of the present invention.

Turning now to the Figures, FIG. 3 shows a data processing arrangement 300 for storing and accessing data, which in this example is video or image data. The arrangement 300 has an input video signal receiver 302, which may receive an input video signal from a communications network such as the Internet or directly from the source that recorded the video.

The input video signal is then optionally subjected to downscaling by means of a downscaler 304. The downscaler 304 can be used to reduce the number of pixels to be processed by the arrangement 300. Downscaling is useful to restrict the amount of processing required by later stages of the arrangement 300 by reducing the total number of pixels that are being processed. This may be helpful if an input video is of a significantly higher resolution (number of pixels) than would be supported by the device on which it is to be displayed. In this case, there is no need to process all the pixels of the input video signal.

In the arrangement 300, several lines of pixels of the input video signal are held in line buffers 306 until a predetermined number of lines are accumulated. In this example, there are four line buffers 306, which each stores a full line of pixels from the input video signal. When the four line buffers 306 are fully filled, sixteen pixels are read from the line buffers 306 and are passed to a block storage control 308 which stores the pixels from those four lines as a block of sixteen pixels in sequential columns of SDRAM memory. This is in contrast to the conventional method of storing the image where there is no such block storage control 308. The block of pixels is then sent to an SDRAM controller 310 for storage in a particular bank, and at a particular row and multiple column addresses in that bank in an SDRAM memory 312.

In order to access the stored blocks of image data for display, the arrangement 300 comprises a Sync Pulse Generator ("SPG") 314. The SPG generates standard video timing signals in the form of horizontal and vertical pulses. It is used to generate the x and y coordinates of an output image that is to be displayed on a screen. In other words, the SPG generates pulses corresponding to the upper-leftmost pixel on the display screen, then to the pixel immediately to its right and scanning in the same manner to the lower-rightmost pixel on the screen. The x and y coordinates used to identify pixel locations on the display screen are referred to herein as "output" coordinates or locations. This is in contrast to the "original" coordinates or locations, which will be designated x' and y' and will now be described.

The output x and y coordinates are fed into a mapper or warp mapping engine 316. The mapper 316 is responsible for determining which pixels in the original input video signal correspond to which pixels in the output video i.e. which pixels from the input image need to be retrieved to display the mapped or warped image on a display. In order to do this, the mapper 316 may use mathematical transformations to map the output coordinates x and y back onto the original coordinates x' and y'. Alternatively, the mapper 316 may use look-up tables to generate the original x' and y' coordinates. In the latter approach, the table may indicate a correspondence or mapping between the output and original pixels, for example where a mathematical transformation is difficult or impossible to define. This may be the case where the mapping comprises "jumbling up" the original image.

In a conventional scaler, complicated mapping is not efficient since all access to stored pixels is limited by the fact that they are stored in terms of horizontal lines of pixels. The only "mapping" readily available is a horizontal or vertical "flip". A horizontal flip (or rotation about the vertical axis) is within the remit of conventional scalers because all of the pixels in the first horizontal line of the output image are in the first horizontal line of the original image; just in the reverse order. Similarly a vertical flip is within the remit of a conventional scaler because all of the pixels in the first horizontal line of the output image are in corresponding positions in the bottom horizontal line of pixels in the input image. Of course, conventional scalers are suited to "normal" input to output mapping where there is limited mathematical transformation or use of a look-up table, and the scaler merely outputs the same x and y coordinates as those that are input to it or applies a simple scaling factor to the output x and y coordinates to determine the original x' and y' coordinates.

The original x' and y' coordinate determined by the mapper 316 specifies the relevant pixel location from the input video signal, which is then used to retrieve the relevant pixel from the SDRAM memory 312. The original x' and y' coordinates are passed to a block request converter 318, which converts the original x' and y' coordinate into a corresponding bank, row and column address in the SDRAM memory in which the block containing that pixel is stored. In other words, the block request converter 312 translates an original x' and y' location into an address into the SDRAM 312 where multiple pixels are stored in a single block.

Since sequential access of pixels often results in pixels from neighboring horizontal and vertical lines in the original image being needed from the SDRAM memory 312, a block request cache 320 is employed to remember recently requested blocks. The cache 320 does not store the contents of the blocks themselves; just the fact that they have been accessed. If a requested block has just been retrieved, the block request cache 320 eliminates the need to issue another command for the memory controller 310 to retrieve that block from the SDRAM memory 312 since it will either already be open or will be in the process of being fetched by the SDRAM controller 310.

When a particular block is retrieved from the SDRAM memory 312, the pixel information from that block is used to populate the empty pixels in the output image. In order to do this, a populator or match and fill engine 322 communicates with a shift register 324 to populate the pixels of the output image. The shift register 324 is employed to store the original x' and y' coordinates that were output from the mapper 316 (which relate to corresponding pixels in the input video) that are to be retrieved from the SDRAM memory 312. The shift register 324 is of an arbitrary length to allow for the delay between the initial calculation of the relevant original x' and y' location by the mapper 316 of the required original pixel from the input video and actually receiving that pixel from the SDRAM memory 312. This delay will be at some semi-random point after the relevant original pixel is requested. A longer shift register may be used where there is a longer delay between a particular pixel or block being requested and that block actually being retrieved from the SDRAM memory 312.

The shift register 324 shifts along as new original x' and y' coordinates are generated by the mapper 316. The shift register 324 includes a field for the pixel value or data value (D) for that pixel which initially starts off empty. As block requests are fulfilled and blocks of pixels are retrieved from the SDRAM memory 312, the block is compared with every shift register entry to see if any of the pixel information in the block can be used to fill in any of the empty entries in the shift register 324. This would be the case if the original x' and y' location of a pixel in a retrieved block matches an original x' and y' location which is already present in the shift register 324. Since several pixels are retrieved in each block (sixteen in our example), multiple shift register locations may be filled from a single block that is retrieved, if they have already been generated.

When a match is found, in other words when the original x' and y' coordinate in the shift register 324 corresponds to the relevant pixel in a block retrieved from the SDRAM memory 312, the corresponding pixel data D is stored in the corresponding shift register 324 data location.

By the time the shift register 324 has shifted from the start to the end, each of its original x' and y' coordinates should have a data value D stored by means of the populator 322. This data value D is the required pixel to output for a given output x and y location, delayed by the length of the shift register 324. By advancing the SPG-generated output x and y locations, this delay can be allowed for.

Once the shift register 324 has been fully populated, the corresponding image is output 326, for example to a display device such as a TV, PC monitor or a projector.

Figures 4, 5:
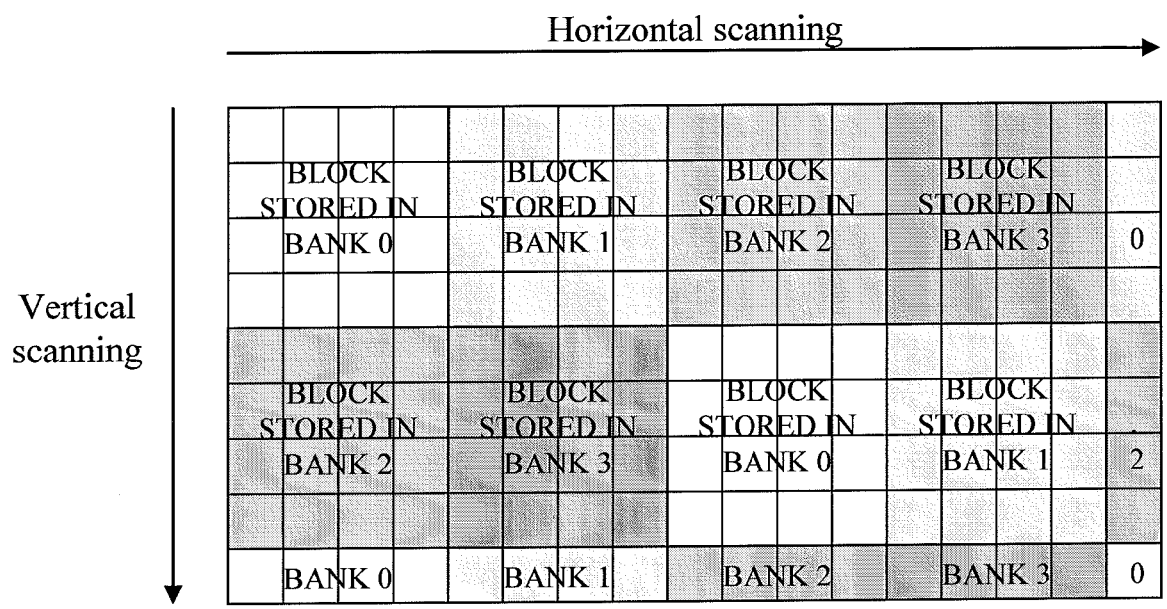
FIG. 4 is visual representation of interleaving banks of SDRAM, in accordance with one or more example embodiments of the present invention.
FIG. 5 is a representation of an input array, in accordance with one or more example embodiments of the present invention.

The entire process can be sped up by interleaving banks in the SDRAM 312. This is because different banks in the SDRAM can be used for storing neighboring blocks of pixels from the original image. As shown in FIG. 4, each block is, thus, surrounded by blocks from different banks 0, 1, 2 and 3. Since one bank can be read while another is being opened or closed, this reduces the amount of time required in the overall processing of the data.

FIG. 5 shows a four-by-four array of sixteen pixels or data elements $\{a_{00}, a_{01}, \ldots, a_{33}\}$, which collectively represent an original image from an input video signal. Each data element $a_{00}, a_{01}, \ldots, a_{33}$ corresponds to one pixel of the sixteen-pixel original image. In practice, most images contain more than sixteen pixels, but a small number of pixels is used here to aid in initial understanding of the invention.

FIG. 6 shows the conventional way of dividing up the array into four horizontal lines $\{a_{00}, a_{01}, a_{02}, a_{03}\}$, $\{a_{10}, a_{11}, a_{12}, a_{13}\}$, $\{a_{20}, a_{21}, a_{22}, a_{23}\}$) $\{a_{30}, a_{31}, a_{32}, a_{33}\}$, each horizontal line containing four pixels. These lines would then be sequentially stored, for example in SDRAM 312 (FIG. 3).

In order to retrieve a particular pixel from memory, the horizontal line containing that pixel would be requested and retrieved from a memory. This operation retrieves all four pixels in that horizontal line. Thus, for example, a command to retrieve pixel $a_{21}$ retrieves the third horizontal line containing pixels $a_{20}, a_{21}, a_{22}$ and $a_{23}$.

In contrast, FIG. 7 shows the improved way of storing the array by dividing it into four two-by-two sub-units or blocks $\{a_{00}, a_{01}, a_{10}, a_{11}\}$, $\{a_{02}, a_{03}, a_{12}, a_{13}\}$, $\{a_{20}, a_{21}, a_{30}, a_{31}\}$, $\{a_{22}, a_{23}, a_{32}, a_{33}\}$. Each sub-unit contains four pixels, as with the FIG. 6 method, but the particular division of the pixels that are stored is different.

FIG. 8 shows the array of FIG. 5 rotated by 90° (or by $\pi/2$ radians) in the clockwise direction. Using the same nomenclature as above, the array of FIG. 5 will be referred to as the "original array" and the rotated array in FIG. 8 will be referred to as the "output array". The upper-leftmost pixel or "origin pixel", $a_{30}$, in the output array was the lower-leftmost pixel in the original array; the pixel immediately to the right of the origin pixel in the output array, $a_{20}$, was immediately above the lower-leftmost pixel in the original array, and so on.

The x and y coordinates of the pixels for display are output from the SPG 314 (FIG. 3) starting with the origin pixel, working horizontally along the uppermost horizontal line, and then moving to the leftmost pixel in the second horizontal line, until the final pixel, which is the lower-rightmost pixel, is rendered.

Since the origin pixel in the output array, $a_{30}$, is the first pixel that needs to be read from memory, the memory controller 310 (FIG. 3) requests the particular block of pixels containing pixel $a_{30}$ from the SDRAM memory 312 (FIG. 3). This is the block that contains pixels $a_{20}, a_{21}, a_{30}$ and $a_{31}$. The entire block is retrieved from the SDRAM memory 312 (FIG. 3) and pixel $a_{30}$ can thereby be accessed.

The next pixel required for the output array is $a_{20}$. This pixel is also located in the same block as pixel $a_{30}$, which has just been retrieved from the SDRAM memory 312 (FIG. 3). Thus, this pixel is immediately available and it is not necessary to retrieve another block from the SDRAM memory 312 (FIG. 3) to obtain pixel $a_{20}$.

The following two pixels required for the output array, $a_{10}$ and $a_{00}$, are not located in the previously retrieved block, so another block must be retrieved. However, they are both located in the block containing pixels $a_{00}, a_{01}, a_{10}$ and $a_{11}$. Thus, once this second block has been retrieved, pixels $a_{10}$ and $a_{00}$ can be rendered substantially simultaneously.

The second horizontal line of pixels in the output array, $a_{31}$, $a_{21}, a_{11}$ and $a_{01}$, is also located in the two blocks that have just been retrieved and a similar process ensues to render those pixels by accessing only two blocks of pixels.

This is to be contrasted to the procedure for performing a 90°-clockwise rotation when the pixels are stored in terms of horizontal lines rather than blocks. The first four pixels required to render the output array, $a_{30}, a_{20}, a_{10}$ and $a_{00}$, would all be in different locations in the SDRAM memory 312 (FIG. 3), since they are all in different horizontal lines of the original array (see FIG. 6). Thus, all four horizontal lines of pixels making up the original image need to be retrieved sequentially from the SDRAM memory 312 (FIG. 3) before the first horizontal line of the output array can be rendered.

Then, in order to render the second horizontal line in the output image, pixels $a_{31}, a_{21}, a_{11}$ and $a_{01}$ need to be retrieved from the SDRAM memory 312 (FIG. 3). Again, with reference to FIG. 6, these are located in different locations in the SDRAM memory 312 (FIG. 3).

It can be seen from this example that the block-based processing method enables 90°-clockwise rotation to be performed twice as fast as in the conventional line-based method. This two-fold increase means that only half the conventional memory access speed is required.

In the case of a sixteen-by-sixteen array (not shown) comprising 256 pixels, which is subject to a 90°-clockwise rotation, the conventional line-based method would require (the first pixel of) all sixteen horizontal lines of sixteen pixels to be read from the SDRAM memory 312 (FIG. 3) before the first horizontal line of the output array could be rendered. Overall, 256 rows would need to be opened and closed before the output image would be fully populated.

However, if the array was stored as sixteen four-by-four blocks each containing sixteen pixels, only four blocks of pixels (those containing the pixels of the first vertical line of the original image) would need to be opened to populate the first horizontal line of the output image. These same four blocks would need to be retrieved again to populate the second horizontal line of the output image. Overall, only 64 rows would need to be opened and closed before the output image would be fully populated.

Figure 2:
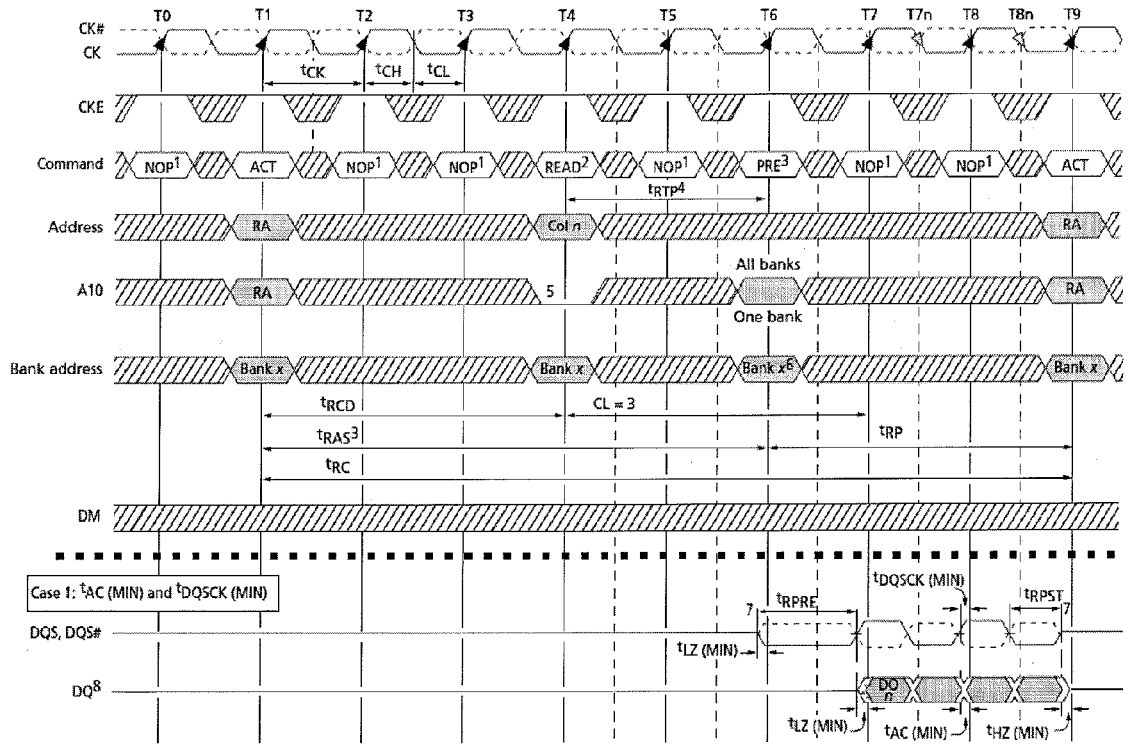
FIG. 2 is a timing diagram of sequential row access in DDR2 SDRAM, to which aspects of various example embodiments may be applied in accessing a sub-array including data elements in adjacent rows.

In this example, it means that the block-based approach is four times faster than the conventional line-based storage approach. Indeed, conventionally it would take ten clock cycles to retrieve a line of sixteen pixels only to use one pixel from that line, because, with reference to FIG. 2, it takes eight clock cycles to retrieve four DQs (between T1 and T9) and a further two clock cycles would be needed (between T9 and T11) to retrieve an additional four DQs so that eight DQs which equates to sixteen pixels have been retrieved.

In the block-based approach, it takes ten clock cycles to retrieve an entire block of sixteen pixels of which four will be used substantially simultaneously.

Although the advantage of storing the pixels in terms of blocks is that sequential reading of the pixels within the block takes as long horizontally or diagonally as it does vertically, it can be seen that there is a certain degree of inefficiency in this method. This is because for most video processing, only pixels from the same row are sequentially accessed, which means that twelve out of the sixteen pixels would probably not be used. However, where some form of mapping is required, the block-based method is considerably more efficient.

The above-described arrangement 300 is suitable for retrieving individual pixels at integer original x' and y' locations but, quite often, for example in rotation at unusual angles, the mapper 316 (FIG. 3) will give non-integer values for original x' and y' coordinate locations for pixels in the original input image.

Figure 9:
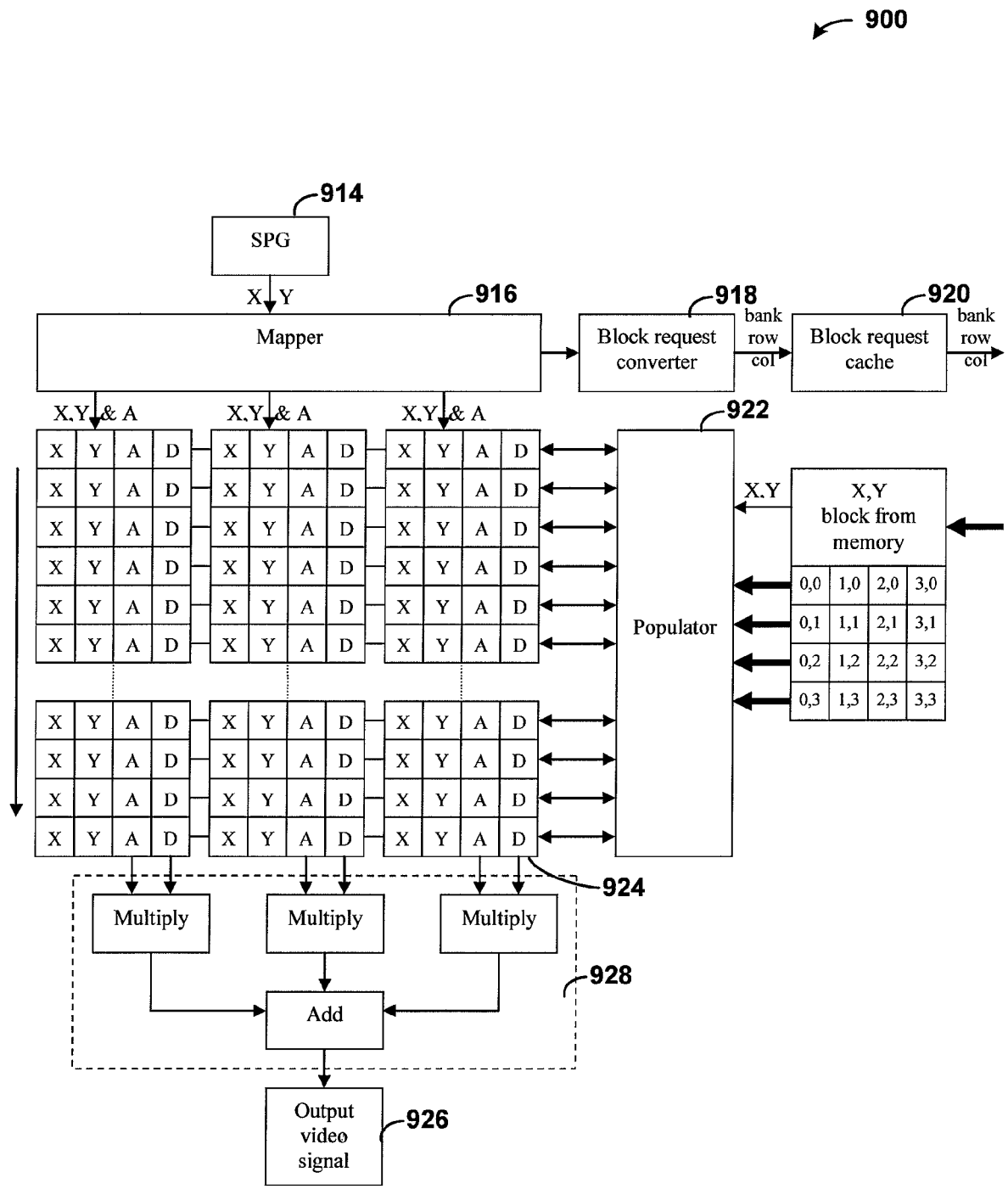
FIG. 9 is a schematic view of a second data processing arrangement, in accordance with one or more example embodiments of the present invention.

FIG. 9 shows an improved arrangement 900 which can be used in such cases. FIG. 9 is similar to FIG. 5, but only the access-side of the arrangement 900 is shown for conciseness. Like components are given corresponding reference signs to those in FIG. 3 except with a prefix of "9" rather than "3".

As can be seen in FIG. 9, the SPG 914 generates output x and y pulses for display and for the mapper 916, which converts the output x and y coordinates into original x' and y' coordinates of the required pixels from the input video. A block request converter 918 then converts the original x' and y' coordinates to a corresponding bank, row and column address into the SDRAM memory (not shown in FIG. 9). The relevant block is retrieved from memory and is used by a populator 922 as in FIG. 3, subject to checking the block request cache 920 to determine whether that block has just been requested.

However, instead of there being a single shift register (324 in FIG. 3), a plurality of shift registers 924 are employed.

To allow non-integer x' and y' locations in the original image to be retrieved, contributions from a plurality of neighboring pixels in the original image can be used to generate the corresponding pixel value in the output image. These contributions can be made by weighting the contribution of each of the relevant neighboring pixels in the original image and adding the respective contributions together.

For example, if a non-integer location of (0.5,2) in the original image is requested, as might be the case if the original image is being scaled up vertically by a factor of two and the output pixel is (1,2), a contribution of 50% from pixel (0,2) added to a contribution of 50% of pixel (1,2) can be used to give the relevant output pixel value. This gives an interpolated pixel in between the two available integer locations in the original image. Thus, using the nomenclature of FIG. 5, if that input image were being upscaled by a factor of two in the vertical direction (so that the output image were an eight-by-four array), the pixel at (1,2) in the output image could be $0.5 \times D(a_{02}) + 0.5 \times D(a_{12})$ where $D(a_{ij})$ is the value D of the entry a, at location (i,j).

Since both of the pixels that are contributing are quite likely to be located in the same block of pixels stored in the memory, no additional SDRAM access is required to facilitate this interpolation. Indeed, using the above example, both pixels $a_{02}$ and $a_{12}$ are located in the same block $\{a_{02}, a_{03}, a_{12}, a_{13}\}$ (see FIG. 7) and, thus, in the same location in memory. Conventionally, they were stored in different horizontal lines (see FIG. 6) and, thus, in different locations in memory.

At most four neighboring pixels in the original image would be required for the interpolation. For example if a non-integer original x' and y' location such as (2.2,6.9) were sought, a contribution from the original pixels at (2,6), (2,7), (3,6) and (3,7) may be used, with the weighting of the respective contributions determined according to some predetermined scheme. The weighting may ideally be determined by the proximity of the non-integer location to the integer locations in the original image that are contributing to it. Thus, in this example, original pixel (2,7) would contribute significantly more than (3,6).

Since the integer pixels in the original image that would contribute to a non-integer pixel will be neighboring, it is fairly likely that they will either all be located in the same pixel block so that no further SDRAM access is required for the interpolation or will be in a neighboring block that has either just been accessed from the SDRAM memory or is just about to be accessed. This reduces the likelihood of increased SDRAM activity.

In order to cater for the non-integer location arrangement, an interpolator 928 is provided between the shift registers 924 and the display for output video 926. The interpolator 928 determines the weighting factors, multiplies the pixel information from each contributing pixel by its respective weighting factor and then performs the summation of these values to arrive at the final output pixel value.

In the above description, the mapper 316, 916 generates a single original x' and y' location for the original pixel (whether an integer or non-integer location). However, with reference to FIG. 10, a modified mapper 1016 could also generate the original x' and y' coordinate in the original image for the next line(s) in the output image. Since the block of pixels retrieved from memory contains several lines of pixels from the original image (four in our example), multiple lines from the mapper 1016 could be populated substantially simultaneously. This is because subsequent lines in the output image will have corresponding original locations that differ only slightly from one output line to the next, making it likely that they will be located in the same pixel block.

Thus, if the SPG 1014 generates an output x and y coordinate of (X,Y), the mapper 1016 could generate the corresponding original x' and y' locations (X', Y') for (X,Y), but also the corresponding original x' and y' locations (X" Y"), (X''', Y''') and (X'''', Y'''') for original x and y locations (X,Y+1), (X,Y+2) and (X,Y+3).'

Figure 10:
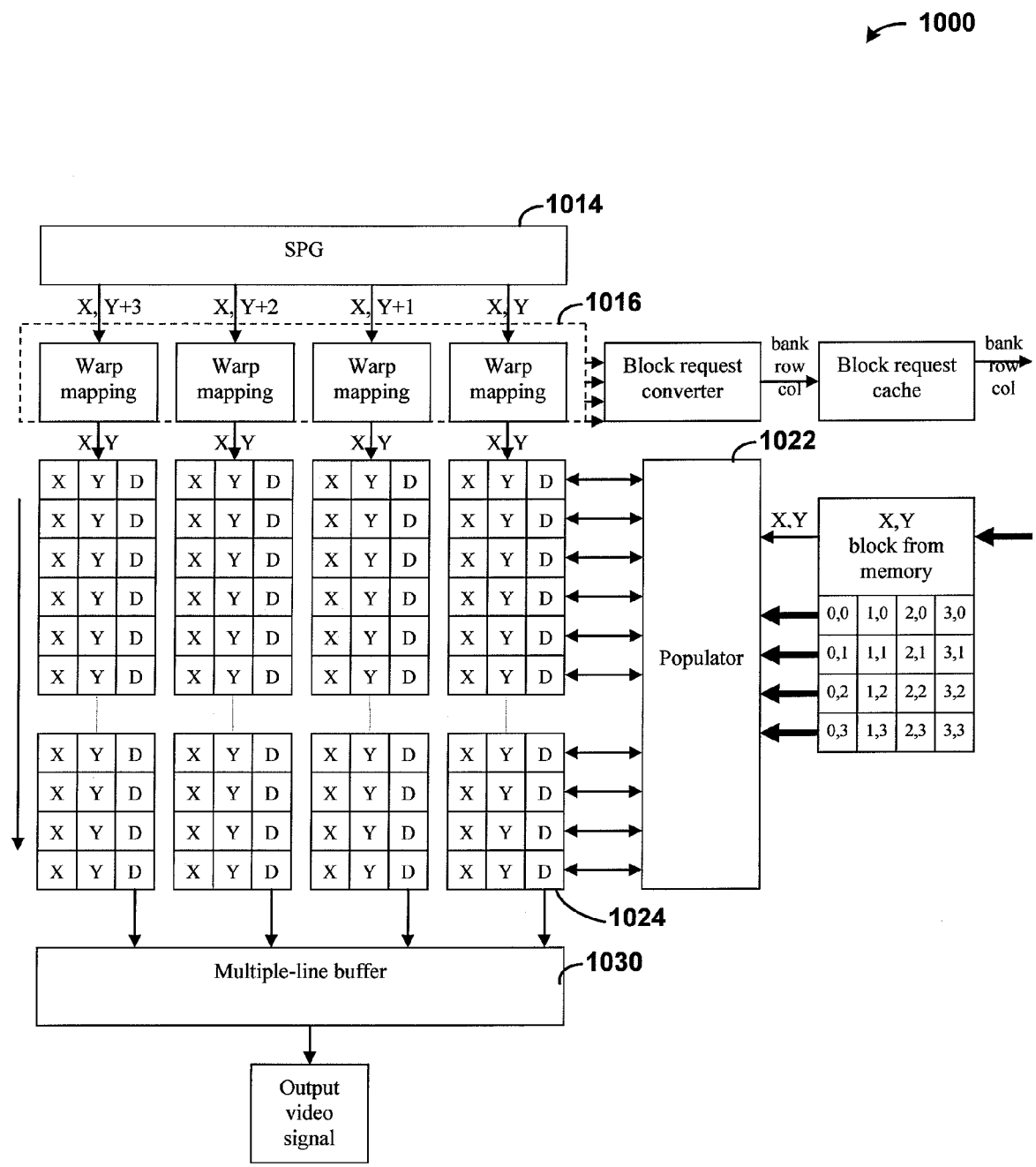
FIG. 10 is a schematic view of a third data processing arrangement, in accordance with one or more example embodiments of the present invention.

In the example of a four-by-four pixel block being used, four horizontal output lines could be generated simultaneously by the mapper 1016 as shown in FIG. 10 with the populator 1022 and the shift registers 1024 being extended accordingly. Thus, a single block of four-by-four pixels retrieved from the SDRAM memory (not shown in FIG. 10) can be used to fill in pixel data for all four lines at once.

Additional line buffers 1030 will be required after the shift registers 1024 to ensure that the additional lines can be processed in the correct order when preparing the output video signal.

This arrangement will greatly reduce the SDRAM load that is required to generate the mapped output signal. However, this comes at the expense of increased circuit complexity, since four mapping engines 1016 are required.

Although the arrangements 300, 900 and 1000 described above greatly reduce the processing time for certain image mappings, the populators 322, 922 and 1022 could be replaced by an alternative arrangement which will now be described.

Figure 11:
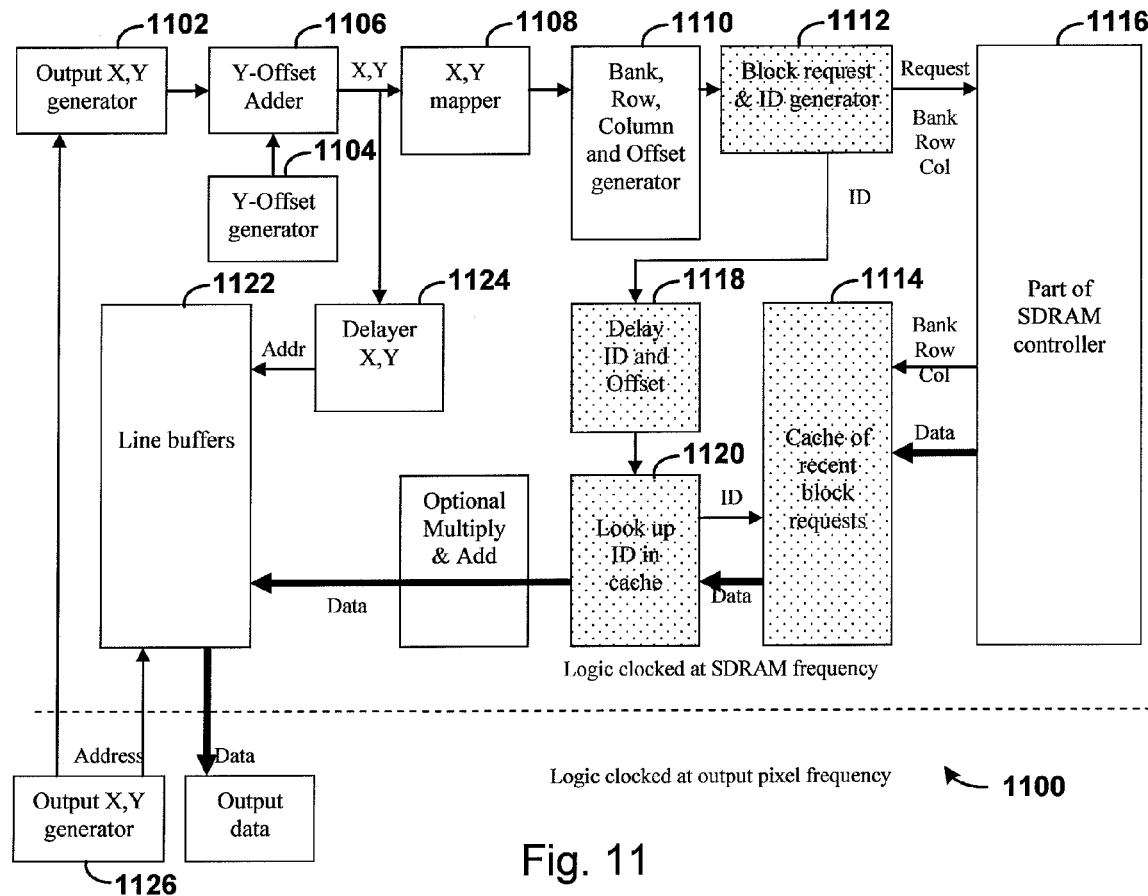
FIG. 11 is a schematic view of a fourth data processing arrangement, in accordance with one or more example embodiments of the present invention.
Figure 12:
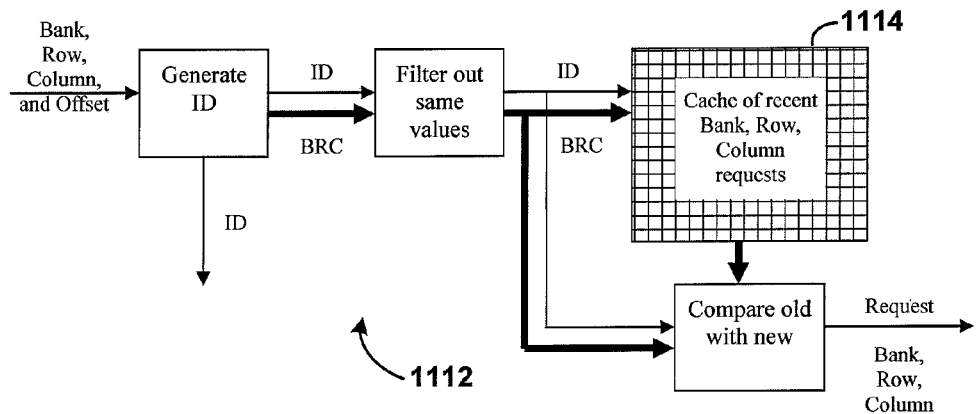
FIG. 12 is a schematic view of a sub-arrangement of the fourth data processing arrangement shown in FIG. 11, in accordance with one or more example embodiments of the present invention.

FIGS. 11 and 12 show an alternative arrangement 1100 for processing image data. An output x and y generator 1102 operates at SDRAM frequencies to generate an x and y location for output data. This is in the conventional manner of scanning from the upper left-most pixel to the pixel immediately on its right and progressing all of the horizontal lines until the coordinate of the lower right-most pixel has been generated whereas the SPGs 314, 914, 1014 operated at the frequency of the display, the output x and y generator 1102 runs at the SDRAM frequency.

However, a Y-offset generator 1104 generates Y offsets for a predetermined number of horizontal lines of coordinates in the output image. In this example, the predetermined number is four. Thus, the Y-offset generator 1104 generates the Y-offset numbers 0, 1, 2 and 3, which corresponds to four horizontal lines. The Y-offset generator 1104 provides the offset values to a Y-offset adder 1106 which receives the single output x and y coordinate (X, Y) from the x and y generator 1102. Thus, for each x and y coordinate (X,Y) output from the generator 1102, a further three coordinates (X, Y+1), (X, Y+2) and (X, Y+3) are generated. Thus, the output from this part of the arrangement 1100 might be {(0,0), (0,1), (0,2), (0,3)}, {(1,0), (1,1), (1,2), (1,3)} . . . .

These output x and y coordinates scan a four-pixel-wide strip of output pixels from left to right and then the next strip down from horizontal lines 4 to 7 inclusive for the output image. A single mapper 1108 receives these strips of output x and y locations and generates the corresponding original x' and y' coordinates locations back to the original input image. Since the original x' and y' locations share similar points in the SDRAM memory by virtue of their being stored in blocks, it is quite likely that subsequently mapped x' and y' locations will be in the same or a neighboring block in storage.

Figure 13:
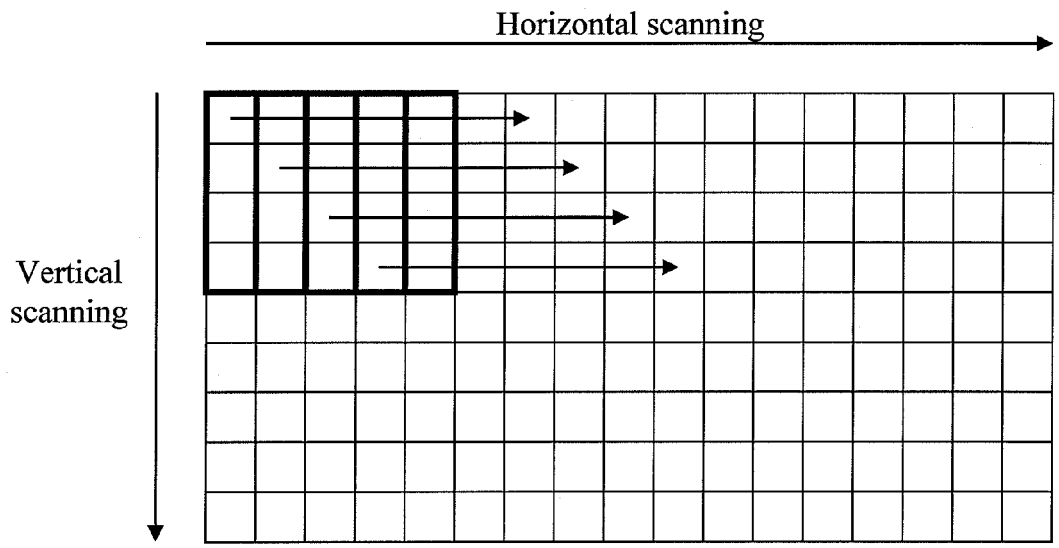
FIG. 13 is visual representation of output stripes, in accordance with one or more example embodiments of the present invention.
Figure 14:
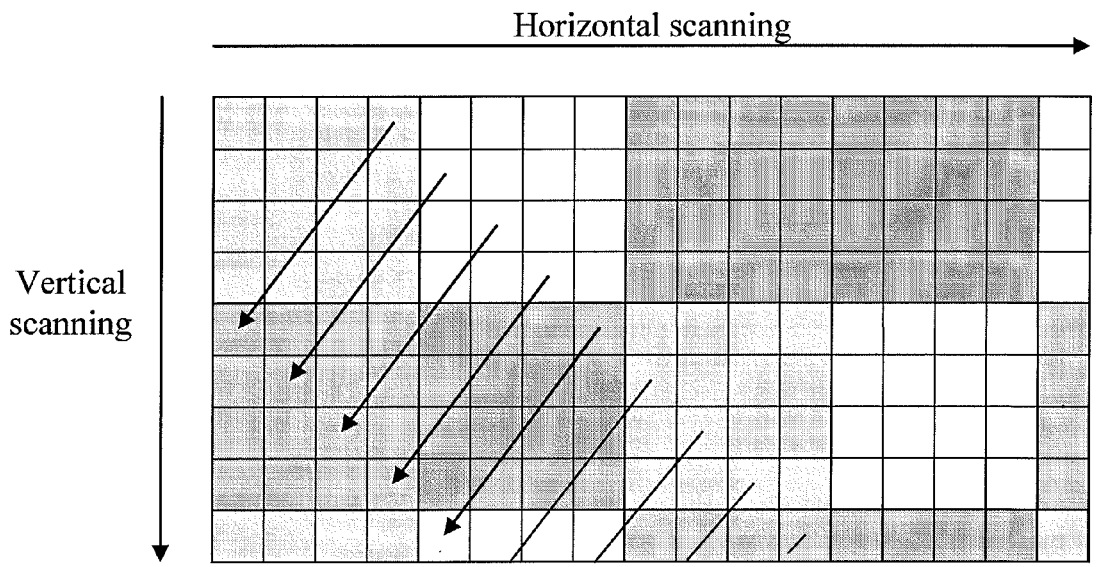
FIG. 14 is visual representation of input stripes, in accordance with one or more example embodiments of the present invention.

Referring briefly to FIGS. 13 and 14 which show the output strips and original strips respectively, it can be seen that when the output video is a rotated version of the original video, the output strips corresponding to the original strips in the original image wipe through the set of stored blocks accessing pixels that are generally very close to these in the preceding location. Since the original image was stored in terms of blocks of pixels rather than horizontal lines, the SDRAM memory needs to be accessed less frequently and thus the overall speed of processing is increased.

Once the original x' and y' coordinates have been generated by the mapper 1108, they are passed to a bank, row and column, and offset converter 1110 ("BRC converter"). The BRC converter 1110 converts each original x' and y' coordinate into a bank, row, column and offset address in the SDRAM memory. In other words, the bank, row column address points to a row and column location in a particular bank of the SDRAM memory in which the block containing the required pixel is located. Once that row and column in the particular bank is accessed, the sixteen-pixel block can be retrieved for processing. The offset value indicates a particular pixel in that particular block. Thus; the offset value for a four-by-four block of pixels would have a value between zero and fifteen. It is preferable to use a value between zero and fifteen, rather than one and sixteen, because fifteen can be represented by four bits, whereas sixteen requires five bits.

Since there can be a large number of rows and columns in each bank in the SDRAM memory, for example 8192 rows and 128 columns in each bank, the BRC value (with offset) may need to be quite large to identify uniquely an individual pixel stored in the SDRAM memory. In order to overcome this, a block request and ID generator 1112 generates an internal ID value for the bank, row and column value. This is, for example, just the lower two significant bits of the bank, row and column addresses put together to form a six-bit address. A different number of lower bits, such as one, three etc could be used depending upon the particular circumstances. This enables $2^6$ (=64) memory locations in the SDRAM memory to be identified on the basis of the bank in which they are located and their row and column in that particular bank.

Since the original x' and y' values tend to sweep or scan across four-by-four memory blocks, as discussed with reference to FIG. 13, at least four banks and either four rows or four columns would be crossed before a new BRC value with the same ID would occur. This equates to around 64 pixels, which means that the ID value will be uniquely valid for at least 64 pixels. Duplicate categories of row and column requests are then filtered out to reduce workload. It is quite likely that there will be duplicate entries of these requests since, given the sweeping nature of the original x' and y' values, pixels will be requested from the same block in memory.

A local cache 1114 of recent block requests is used to detect new block requests. If a new BRC value is requested, the SDRAM controller 1116 retrieves that particular block from the SDRAM memory. It is to be noted that the six-bit ID value is not used by the SDRAM controller 1116 because it is an internal value that would not be recognized by the SDRAM controller 1116 as an address in SDRAM memory. The SDRAM controller 1116 requires a full BRC address to enable it uniquely to identify the correct location in the SDRAM at which the pixel block is stored. The ID value, which is only one of 64 values in this example, is used as an address into 64 location memories storing the full BRC values. Thus, if a new BRC value with the same ID is detected, a request still goes to the SDRAM controller to get that block from memory.

The ID value generated (along with the offset value, in this case the value between zero and fifteen of the particular pixel within the sixteen-pixel block) for that particular original x' and y' location is passed to a delay generator 1118 to ensure that the SDRAM controller 1116 has had sufficient time to retrieve the required block of pixels from the SDRAM memory. In the meantime, the SDRAM controller 1116 has stored the requested BRC data, the data contained in the block at the relevant BRC address, into a 64-entry cache.

A look-up engine 1120 looks into the cache 1114 using the delayed ID value and offset and stores the retrieved value in a large line buffer memory 1122. In this example, there are at least four line buffers 1122 to which information can be written. The retrieved data values may be subject to interpolation as described above. A delayed output x and y location has been retained by a delayer 1124 located between the x and y, x' and y' generating part 1102, 1104, 1106 of the arrangement 1100 and the line buffers 1122. The delayed output x and y location is used as a pointer for where to store the data in the line buffers 1122.

On the pixel-clock side of the arrangement 1100, another output x and y generator 1126 which is clocked at the output pixel frequency counts output x and y locations normally, rather than adding y-offsets for stripes, reads out the output pixels from the line buffers 1122 and sends them for further use.

The pixel-clock side and SDRAM-clocked side need to be in partial synchronization, so that the line buffers 1122 are filled just ahead of being accessed. A double-buffer approach can be used to ensure that the SDRAM-clocked side is accessing the next lines of data while the pixel-clocked side is accessing the previous lines. In other words, the SDRAM- and pixel-clocked logic need to be synchronized such that the SDRAM-side output x and y generator 1102 writes to one half of the line buffers 1122 while the pixel-side output x and y logic 1126 reads from the other half of the line buffers 1122. The two halves of the line buffers 1122 then swap over, forming a simple double-buffer system to avoid instances where writing to the line buffers 1122 overtakes reading to them.

Figure 15:
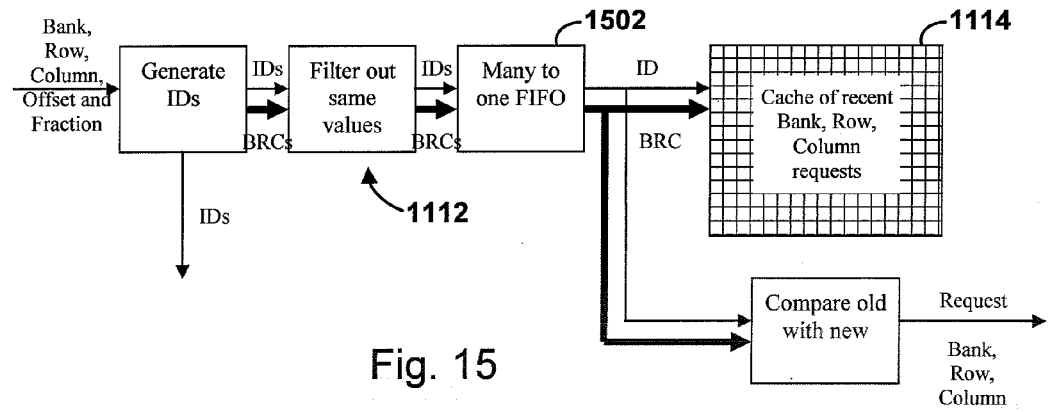
FIG. 15 is a schematic view of a sub-arrangement of the fourth data processing arrangement shown in FIG. 11 for anti-aliasing or smoothing, according to another example embodiment of the present invention.

Anti-aliasing or smoothing of an output image can also be achieved using multiple instances of the Block Requestor-Delay-Caching arrangement 1112, 1114, 1118, 1120 (those marked with a patterned background in FIG. 11). Data created from a fractional part of an original x' and y' coordinate can be used to introduce extra original x' and y' locations that will be merged together. The block requestor 1112 would require a many-to-single First in First Out (FIFO) 1502 (see FIG. 15) so that only a single BRC cache 1504 is required. Data from the SDRAM controller 1116 would be stored in multiple cache entries (or a single multi-port memory) with data retrieved from the delayed IDs sent from the block requestor 1112. This data would then be merged together using the fractional values, in a similar way to the interpolation described above into a single pixel for storage in the line buffers 1122.

If multiple input sources are used, they could be stored in different locations in the SDRAM memory 1116. A source-mapping function could be implemented either before or after the mapper 1108 to regenerate the required original x' and y' location to point to a different source in memory 1116. Source-mapping before warp-mapping would allow individual windows to be mapped separately, possibly by different warp functions. Source-mapping after warp-mapping would allow a warp-map to be applied to multiple windows at once.

Figure 16:
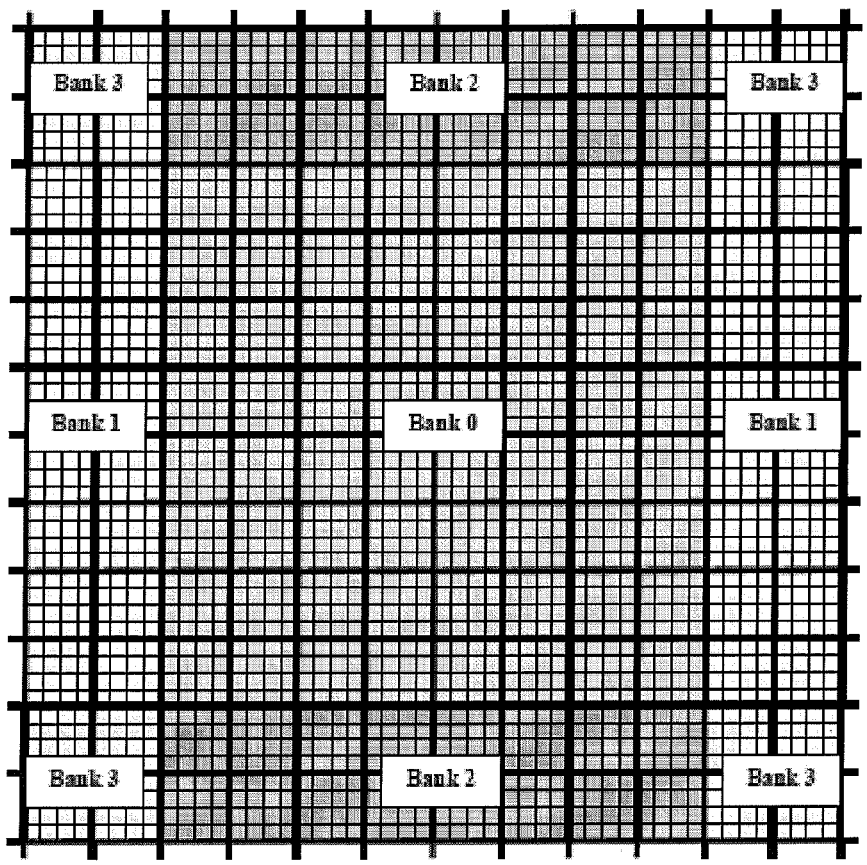
FIG. 16 shows an arrangement for storing data in the SDRAM, in accordance with another example embodiment.

FIG. 16 shows an arrangement for storing data in the SDRAM, in accordance with another example embodiment. With reference to FIG. 4, neighbouring blocks of 4×4 blocks of pixels are stored in different banks in the same SDRAM memory. As shown in FIG. 16, 64 blocks of 4×4 pixels are stored in the same bank in SDRAM memory. Typically, an SDRAM row consists of 512 column addresses and, as explained previously, each column address can store 2 pixels' worth of image data. Thus, 1024 pixels' worth of information can be stored in each SDRAM row. Since each 4×4 block of sixteen pixels requires 8 column addresses, this means that 64 4×4 blocks can be stored in each SDRAM row. These 64 blocks are stored as an 8×8 array of 16-pixel blocks. This gives a total of 32×32 (=1024) pixels in a single SDRAM row in a single bank of the SDRAM memory.

Adjacent 32×32 arrays of pixels, each of which requires a single SDRAM row, are stored in different banks in the SDRAM memory. This allows fast movement between adjacent arrays of pixels, since different banks can be accessed quickly.

By storing pixels in this way, as pixels are retrieved from the SDRAM, the same SDRAM row remains active for longer periods (e.g., as compared to the arrangement shown in FIG. 4). This is because a greater number of adjacent pixels are located in the same SDRAM row. As explained previously, this results in faster processing times, because the SDRAM rows need to be opened and closed less frequently. Since all banks in the SDRAM memory can be open simultaneously, this storage arrangement gives substantially instantaneous access to 16×16 4×4 pixel blocks which equates to 4,096 individual pixels.

Figure 17:
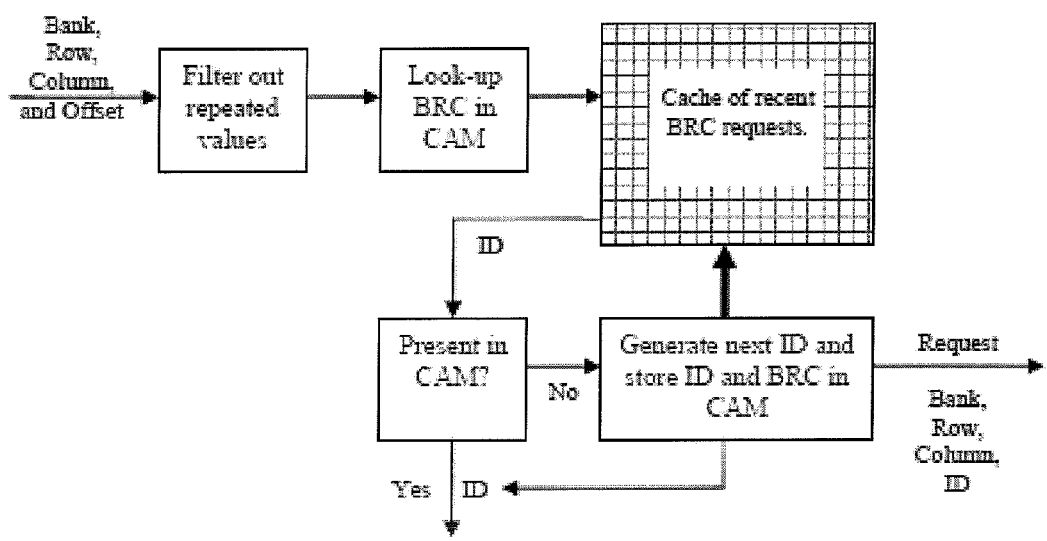
FIG. 17 shows an arrangement in accordance with another example embodiment, in which a content addressable memory (CAM) enhancement is used.

FIG. 17 shows an arrangement in accordance with another example embodiment, in which a content addressable memory (CAM) enhancement is used. The CAM enhancement allows less memory to be used during read-back of the pixels. This is because the CAM can hold a random-access cache of recently used blocks of 4×4 pixels. A whole display line's worth of blocks could be stored in the cache.

As explained previously, standard SDRAM requires a memory address in order to retrieve data from it. Content addressable memory determines which location stores the particular data that is required. Since image warping in rotation requires near random addresses to be obtained from the SDRAM (they are not predictable), the cache of recent block requests 1114 (FIG. 11) would need to be as large as the final display resolution. If the display width were 2048 pixels, a 2048×2048 pixel cache would be required, for example if 90° rotation were in use.

In this embodiment, the CAM stores the block location (e.g. (0,0) being the location of the top-left block in the original source image, (1,0) being the one to the right of it etc.) along with the 4×4 pixel data. As block requests are made, the CAM is interrogated for the particular block location of the matching block. If that block does not exist in the CAM, then a request is sent to the SDRAM to retrieve that block. Otherwise, since the CAM location would be known and it would also have the 4×4 pixel data in it, the required block could easily be obtained from the CAM by using the address in the CAM.

In one implementation, the CAM stores the original block location (as above), with the CAM address becoming the normal memory cache address (ID) that contained the 4×4 pixels for that block. This means that the CAM can be smaller as it would store less data (which can address complexity and expense matters).

In using the CAM, the ID (cache location) value is no longer generated from the lower 2 bits of the bank, row and column address as was explained with reference to FIG. 12. It is, instead, the CAM address location found after searching for that particular block within the CAM. The memory location that has the matching BRC address as the ID value. If the block location (bank, row, column) data is not found anywhere in the CAM, i.e. if the block having that block location has not previously been retrieved, a new and subsequent CAM memory location having a subsequent location ID is generated using a counter and the requested BRC address is stored in it. A future request for the same BRC will then generate this CAM address, which forms the ID that is passed on, after a delay line, the 4×4 pixel cache 1114 shown in FIG. 11.

Using this approach, the SDRAM memory can be read in a manner that is independent from direction or angle, or according to which warp function. The CAM remembers the recent block requests irrespective of the SDRAM location. The (relative) approach shown in FIG. 12 stores a local cache of neighbouring pixels in a square grid, whereas the CAM approach can store the pixels in any shape.

By way of an example, a 2048×2048 pixel output resolution would require at least 512 CAM locations to cover a whole line of pixels, since each CAM location can store 4 pixels' worth of information. The address for each CAM location could be 18 bits wide (2 bits for the bank, 6 bits for the column and 10 bits for the row). Therefore, the CAM size, in bits, would be 512×18 which equals 9216 bits. Although this may appear to be a relatively small figure, it would require around 10,000 more logic cells in an FPGA in order to locate the required data. On a typical FPGA, this would take the total number of logic cells to around 20,000, which is likely to be too high to be practical. Thus, this method is more suitable for ASIC usage, unless an external CAM is used.

In some embodiments involving the use of a CAM, the multiple line buffers 1122 shown in FIG. 11 are eliminated, and a single line is processed at any one time (e.g., rather than multiple lines).

While certain aspects of the present invention have been described with reference to several particular example embodiments, those skilled in the art will recognize that many changes may be made thereto without departing from the spirit and scope of the present invention. For example, the various circuits, memories and related components may be implemented in connection with a variety of different approaches, which may involve one or more of computers, programmable circuits, processor-readable media containing instructions that cause a computer to carry out steps upon execution, and others. Aspects of the invention are set forth in the following claims.

The invention claimed is:

1. An apparatus for processing data, the apparatus comprising:
    a receiver configured and arranged to receive data in the form of an array of data elements, the data elements being arranged in horizontal and vertical lines;
    a memory controller configured and arranged to store, in a memory location, a sub-unit of the array that includes a subset of data elements from each line of neighboring horizontal and vertical lines of the array; and
    a retrieving circuit configured and arranged to retrieve the sub-unit from the memory location for processing;
    an output coordinate generator configured and arranged to generate output coordinates;
    a mapper configured and arranged to identify original data coordinates corresponding to the generated output coordinates;
    a shift register configured and arranged to store the identified original data coordinates and an associated corresponding data value; and
    a populator configured and arranged to retrieve said data values from corresponding sub-units retrieved from memory.

2. An apparatus according to claim 1, wherein
    the sub-unit comprises a block of data elements, and
    the populator is configured to retrieve the sub-unit by retrieving the entire sub-unit with a single access to the memory location, during which single access the data elements that are retrieved consist of those data elements in the block.

3. An apparatus according to claim 1, wherein storing a sub-unit includes storing a subset of the data elements in each of at least two immediately adjacent horizontal lines and at least two immediately adjacent vertical lines, the subset of each line being less than all of the data elements in the line.

4. An apparatus according to claim 1, further including
    a plurality of line buffers each configured to hold a different horizontal line of data elements of the array, and
    a storage controller configured to cause the memory controller to store a subset of data elements from each of the different horizontal lines of data elements and from two or more of the line buffers as the sub-unit in the same memory location.

5. An apparatus according to claim 1, wherein the mapper is configured and arranged to convert the output coordinates into the original data coordinates of data elements that are stored in memory and that contribute information to the corresponding output coordinates.

6. An apparatus according to claim 5, wherein the mapper is configured and arranged to use a look-up table to convert the output coordinates into the original data coordinates.

7. An apparatus according to claim 5, further including a converter configured to receive the original data coordinates and determine the memory locations of the sub-units of data elements stored in the memory that contain the data elements.

8. An apparatus according to claim 1, wherein the mapper is configured and arranged to use a mathematical transformation to convert the output coordinates into the original data coordinates.

9. An apparatus according to claim 1, wherein the populator is configured and arranged to assign the data values using data elements of sub-units retrieved from the memory by matching the original data coordinates held in the shift register with the original data coordinates in the retrieved sub-unit.

10. An apparatus according to claim 9,
    wherein the populator is configured, in response to the original data coordinate being a non-integer value coordinate, to retrieve data values of neighboring data elements having integer value original data coordinates,
    further including an interpolator configured to provide an output including weighted contributions from each of the retrieved data values of the integer original data coordinates, and
    further including a plurality of shift registers that respectively store the original data coordinates with a corresponding data value.

11. An apparatus according to claim 1, further including
    a memory-side output data coordinate generator configured to generate a set of output data coordinates at a memory frequency,
    a display-side output coordinate generator configured to generate output display coordinates at a display frequency, and
    an offset arrangement configured to receive the output data coordinates from the memory-side output data coordinate generator and produce an additional set of output data coordinates corresponding to another line of output data coordinates.

12. An apparatus according to claim 11, wherein the mapper is configured and arranged to receive the set and additional set of output data coordinates and translate them into original data coordinates, and
    further including a converter configured to receive and convert the original data coordinates into an address into the memory, the address indicating the memory location at which the sub-unit or units containing the data elements at the original data coordinates are located.

13. An apparatus according to claim 12, wherein the converter is configured to convert the original data coordinates into an address that includes a bank, row and column in memory in which the sub-unit is located and an offset value that indicates a particular data element in a sub-unit.

14. An apparatus according to claim 12, further including an ID generator configured to generate an internal ID value using the address, a cache configured to store recently requested sub-units, a delayer configured to hold the original coordinates, and a look-up engine configured to look into the cache using the ID value, retrieve the relevant sub-unit of data elements having the same ID value and fill in data entries for corresponding original data coordinates in line buffers.

15. An apparatus according to claim 14, further including a plurality of line buffers, wherein the output coordinates generated by the memory-side output coordinate generator are written to some of the line buffers and corresponding data values can be read from others of the line buffers.

16. An apparatus according to claim 1, wherein the apparatus includes a video scaler.

17. An apparatus according to claim 1, further including an SDRAM memory having respective banks, and wherein the memory controller is configured to store the sub-unit by storing the sub-unit in a memory location in one bank of the SDRAM memory, and configured to store a neighboring sub-unit of the array in a different bank in the SDRAM memory.

18. An apparatus as claimed in claim 1, further comprising a block request cache configured and arranged to record addresses of recently retrieved sub-units.

19. An apparatus as claimed in claim 1, wherein the shift register is configured and arranged to store the associated corresponding data value by storing a data value that is assigned using at least one data element from said at least one sub-unit retrieved from memory, by matching said data value to a corresponding original data coordinate.

20. An apparatus for processing video data, the apparatus comprising:

a receiver circuit configured to receive video data in the form of an array of pixels arranged in horizontal and vertical lines, the array of pixels representing an image;

a plurality of line buffer circuits respectively configured to hold a different line of pixels of the received array;

a memory controller circuit configured to store, in a single memory location, a sub-block of the array that includes a subset of pixels from at least two of the line buffers, each subset of pixels including less than all of the pixels from each line, each block of pixels representing a sub-portion of the image;

a mapper configured and arranged to identify original data coordinates corresponding to output coordinates for an image represented by the pixels; and a populator circuit configured and arranged to retrieve the sub-block from the memory location for processing, and to assign data values to data fields, in a shift register, corresponding to the original data coordinates using data elements of the sub-block by matching the original data coordinates with original data coordinates in the retrieved sub-block.

21. A method for implementation by a programmable computer that executes instructions to cause the programmable computer to perform the following steps:

receiving data in the form of an array of data elements, the data elements being arranged in horizontal and vertical lines;

storing, in a memory location, a sub-unit of the array that includes a subset of data elements from each line of neighboring horizontal and vertical lines of the array;

identifying original data coordinates corresponding to output coordinates for the array of data; and retrieving the sub-unit from the memory location for processing, and assigning data values to data fields, in a shift register, corresponding to the original data coordinates using data elements of the subset by matching the original data coordinates with original data coordinates in the retrieved sub-unit.

* * * * *